United States Patent [19]

Qualkenbush

[11] Patent Number: 5,058,255

[45] Date of Patent: Oct. 22, 1991

[54] CAM SHAFT BUSHING PULLER

[76] Inventor: Jack D. Qualkenbush, 1422 Perry St., Vincennes, Ind. 47591

[21] Appl. No.: 569,408

[22] Filed: Aug. 17, 1990

[51] Int. Cl.[5] ............................................ B23P 19/04

[52] U.S. Cl. ........................................ 29/255; 29/282

[58] Field of Search ................. 29/263, 264, 265, 280, 29/255, 254

[56] References Cited

U.S. PATENT DOCUMENTS

| | | | |
|---|---|---|---|
| 2,290,427 | 7/1942 | Harrington | 29/265 |
| 2,775,025 | 12/1956 | Williams | 29/280 |
| 3,529,497 | 9/1970 | Brooks | 29/254 |
| 4,207,664 | 6/1980 | Zoula | 29/265 |

*Primary Examiner*—Robert C. Watson

*Attorney, Agent, or Firm*—H. John Barnett

[57] ABSTRACT

An improved camshaft bushing puller comprising a split collar comprising two hemi-annular sections which can be flexibly compressed to a smaller diameter for insertion into a camshaft bushing. The outer ends of each hemi-annular section have integral outer peripheral lips adapted to engage the outer end of the bushing. Complementary threaded grooves receive the end of a conventional pulling handle which urges the bushing puller into uniform solid contact with the camshaft bushing for effective uniform pulling action.

1 Claim, 1 Drawing Sheet

CAM SHAFT BUSHING PULLER

BACKGROUND

1. Field of the Invention

This invention is directed to a diesel engine maintenance tool for in-frame removal of the end cam shaft bushing which cannot be pushed out because of limited clearance between the engine block and adjacent engine parts. This device pulls the cam shaft bushing from its seat in the cam shaft housing.

2. Description of Related Art

The following patents describe a variety of engine maintenance tools:

| U.S. Pat. No. | Name | Date |
|---|---|---|
| 3,945,104 | Brookover | 1976 |
| 4,339,865 | Shultz | 1982 |
| 4,794,683 | Pacheco | 1989 |

Brookover describes a cylinder liner puller tool 20 for removing a cylinder liner 13 from an engine block 10. Tool 20 includes a head 21 which has a pair of spring-loaded dogs 27, which are the sole means for pulling the cylinder liner 13. This system does not have the uniformly distributed pulling force which a split bushing puller provides, and would probably be more prone to breakage. A cam shaft bushing puller similar to Brookover's tool has been used, but is prone to breakage.

Shultz is intended for pulling water pump bearings which comprises a six part, split mandrel, which includes a mandrel spreader 16. The mandrel 14 is formed from a plurality on annular segments 38 which are held together by means of a plurality of O-rings 40. The spreader 16, and the drive shaft 12 extend out the ends of the pump housing, so that this device could not operate in close quarters.

Pacheco is of general interest, only, being directed to a cam shaft manipulating tool. It is not intended for pulling cam shaft bushings.

SUMMARY OF THE INVENTION

Considerable labor can be saved by doing in-frame maintenance of a large diesel engine. However, the end cam shaft bushing cannot be pushed out to remove it in a typical diesel engine which has other engine parts assembled at the end of the engine block.

The subject invention is directed to a cam shaft bushing puller for removing an end cam shaft bushing in an internal combustion engine housing where there is limited clearance between the engine block and the adjacent engine parts. The device comprises a split, spring-loaded bushing puller having pulling flanges on the outer end. The bushing puller is compressed to insert it in the sleeve-type cam shaft bushing. The split bushing puller parts have an axially disposed, threaded opening, into which a complementary handle is threaded to provide a means to pull the cam shaft bushing out of the cam shaft housing by the use of a conventional slide hammer assembly.

DESCRIPTION OF THE PREFERRED EMBODIMENT

Figure 1:
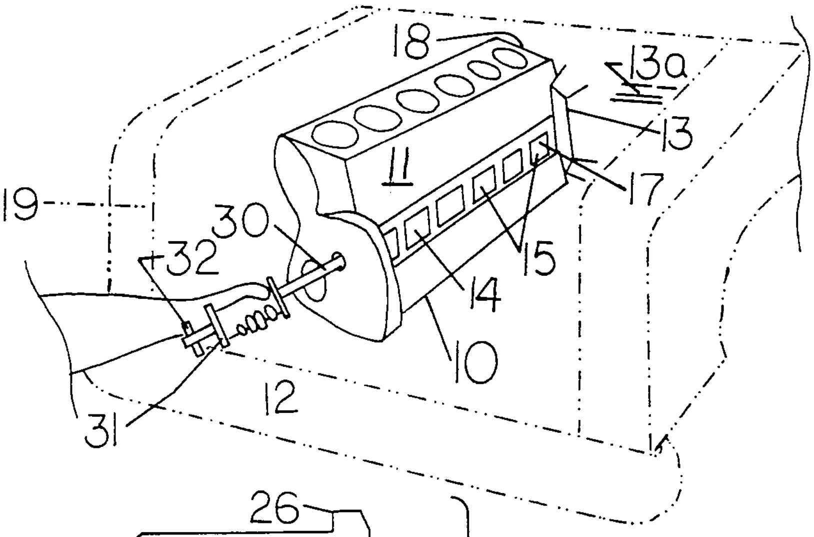
FIG. 1 is a schematic, side plan view with some parts shown in phantom, and some parts removed, showing a large diesel engine with the cam shaft bushing puller of the invention shown in position to pull the end cam shaft bushing.

As shown in the drawings, a six cylinder Cummins diesel engine 10 includes a cylinder block 11, a camshaft 12 and a flywheel housing 13. The cylinder block 11 is provided with a cam follower housing 14 which covers a series of apertures 15 in cylinder block 11 to provide access to camshaft chamber 16 and camshaft 12.

When flywheel housing 13 is in place, it eliminates end access to end camshaft bushing 17 from outer end 18 of the cylinder block 11. In order to remove the end camshaft bushing 17 using a conventional cam shaft bushing tool, it is necessary to remove the flywheel housing 13. To remove the flywheel housing 13, it is necessary to disconnect it from the transmission 13*a*, which is a time consuming procedure. It has been estimated that it takes about four hours to disassemble the parts required to provide external access to the end camshaft bushing 17.

Removal of the engine 10 from the engine compartment 19 involves considerable additional time and labor, and adds to the cost of the engine maintenance and repair. Others have proposed using a bushing puller tool similar to the cylinder liner puller tool described in Brookover U.S. Pat. No. 3,945,104, but this device is prone to breakage because it employs a pair of spring loaded dogs which do not make uniform contact around the end edges of the bushing.

Figure 2:
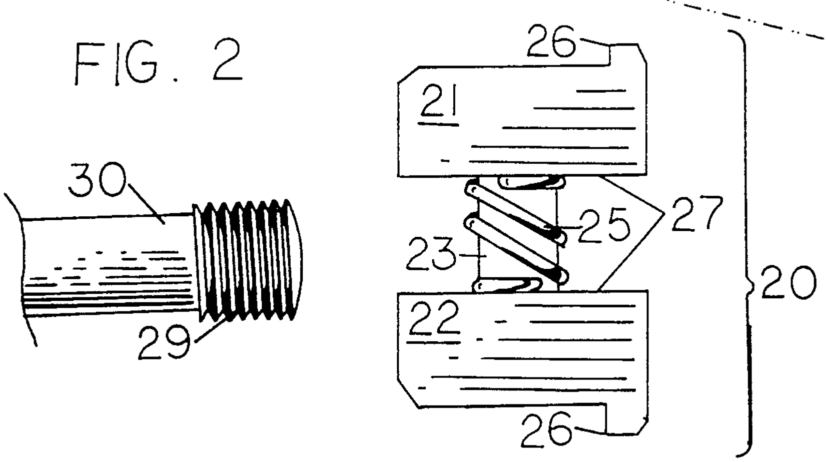
FIG. 2 is an enlarged side elevation of split, spring-loaded cam shaft bushing puller showing the pulling ledge.
Figure 3:
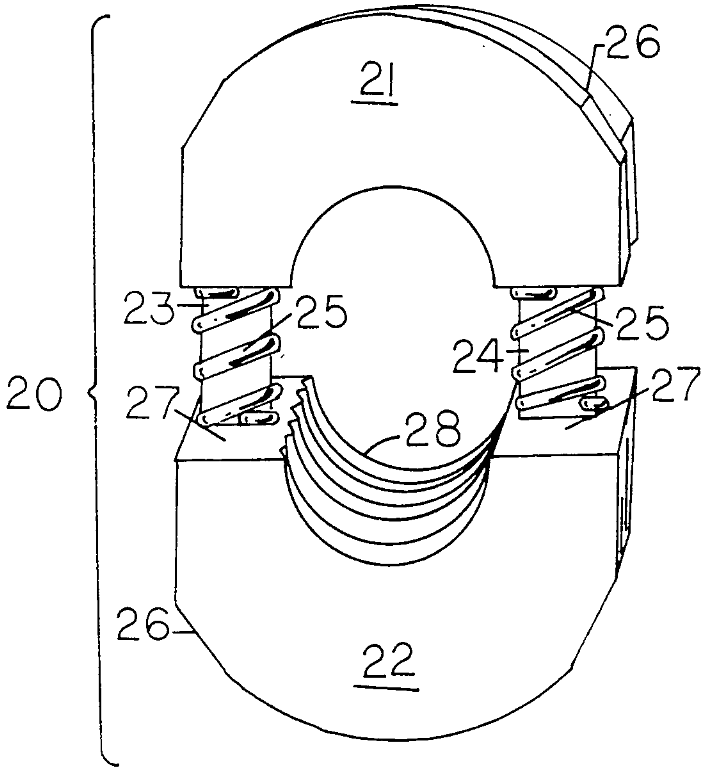
FIG. 3 is an enlarged end perspective of the cam shaft bushing puller of FIG. 2 showing the spring biased connecting pins and the central threaded opening for receiving the operating shaft shown in FIG. 1.

As shown in FIGS. 2 and 3 of the drawings, an improved cam shaft bushing puller 20 comprises a pair of semi-annular collars 21 and 22 which are interconnected by slide pins 23 and 24. Each slide pin 23 and 24 is provided with a helical spring 25 which biases the semi-annular collars 23 and 24 away from each other, but can be compressed when the semi-annular collars 23 and 24 are forced together to a smaller diameter. The corresponding ends of each collar 23 and 24 have an outwardly projecting lip 26 extending around the outer periphery thereof.

Inner, opposite facing surfaces 27 of the semi-annular collars 23 and 24 are provided with an axially extending threaded groove 28. The grooves 28 cooperate to receive threaded end 29 of operating handle 30, shown in FIG. 1. Operating handle 30 is provided with a slide hammer 31 and end stop 32 which operate in a conventional way to give a pulling force.

In use, the camshaft bushing puller 20 is compressed and inserted through aperture 15 adjacent the end camshaft bushing 17. Puller 20 is then pushed into bushing 17 until the lips 26 expand around the outer end of bushing 17. The operating handle 30 is then extended through the camshaft chamber 16, and threaded end 29 is threaded into the threaded grooves 28 of camshaft bushing puller 20 to firmly urge lips 26 against the outer ends of the camshaft bushing 17. This same action firmly connects operating handle 30 to camshaft bushing puller 20 so that when slide hammer 31 is pounded against end stop 32, it transmits a pulling force to camshaft bushing puller 20, and through the lips 26 to the end camshaft bushing 17.

When the camshaft bushing 17 is pulled from its seat and is in line with aperture 15, the operating handle 30 is removed from the camshaft bushing puller 20, and camshaft bushing 17 is removed with camshaft bushing puller 20 through aperture 15. After the operating handle 30 has been unthreaded and removed from camshaft bushing puller 20, it can be compressed to reduce its diameter and slid free of the camshaft bushing 17.

The improved camshaft bushing puller of this invention provides uniform and positive pulling force around the outer edge of the camshaft bushing because the peripheral pulling lips are integral with the main body of the tool. The tool is adaptable to more than one diameter bushing by using a different diameter operating handle, or an operating handle having several diameter threads on its end. As contrasted with the prior art pulling tools, the subject camshaft bushing puller expands to come into firm surface contact with the inner surface of the camshaft bushing, and the lips are in uniform pulling contact around the outer end of the bushing to provide effective and sure bushing removal for in-frame diesel engine maintenance.

I claim:

1. A camshaft end bushing puller which requires no contact with the inner end wall of the associated engine block, comprising:

first and second hemi-annular collars, each having a semi-cylindrical outer side surface and flat, inner surfaces, the flat, inner surfaces of each collar being bisected by an axial, semi-cylindrical, threaded passage which extends through the respective collar, the semi-cylindrical outer surfaces each having a peripheral lip extending around one end thereof;

a pin-receiving opening disposed centrally in each of the flat inner surfaces of the hemi-annular collars;

resiliently biased pins extending between the opposed pin-receiving openings so that said first and second hemi-annular collars are disposed with their flat, inner surfaces opposed to define a compressible, annular collar; and an elongated shaft having an inner, threaded end and an outer end having a slide hammer mounted thereon, said inner threaded end of the elongated shaft being threadably received int he aligned axial, semi-cylindrical, threaded passages of the compressible, annular collar when disposed inside an end bushing with the peripheral lips of the collar against the outer end of the bushing so that a pulling force may be applied against the bushing by means of the slide hammer to remove the end bushing towards the direction of the slide hammer.

* * * * *